US008995926B2

(12) United States Patent
Mow et al.

(10) Patent No.: US 8,995,926 B2
(45) Date of Patent: Mar. 31, 2015

(54) METHODS AND APPARATUS FOR PERFORMING COEXISTENCE TESTING FOR MULTI-ANTENNA ELECTRONIC DEVICES

(71) Applicant: Apple Inc., Cupertino, CA (US)

(72) Inventors: Matthew A. Mow, Los Altos, CA (US); Thomas E. Biedka, San Jose, CA (US); Ming-Ju Tsai, Cupertino, CA (US); Liang Han, Sunnyvale, CA (US); Xu Han, San Jose, CA (US); Anand Lakshmanan, Sunnyvale, CA (US); Nanbo Jin, Sunnyvale, CA (US); Hongfei Hu, Santa Clara, CA (US); Dean F. Darnell, San Jose, CA (US); Joshua G. Nickel, San Jose, CA (US); Jayesh Nath, Milpitas, CA (US); Yijun Zhou, Sunnyvale, CA (US); Hao Xu, Cupertino, CA (US); Yuehui Ouyang, Cupertino, CA (US); Nirali Shah, Mountain View, CA (US); Mattia Pascolini, Campbell, CA (US); Robert W. Schlub, Cupertino, CA (US); Ruben Caballero, San Jose, CA (US)

(73) Assignee: Apple Inc., Cupertino, CA (US)

( * ) Notice: Subject to any disclaimer, the term of this patent is extended or adjusted under 35 U.S.C. 154(b) by 195 days.

(21) Appl. No.: 13/629,414

(22) Filed: Sep. 27, 2012

(65) Prior Publication Data

US 2014/0087668 A1   Mar. 27, 2014

(51) Int. Cl.
*H04B 17/00* (2006.01)
*H04W 24/00* (2009.01)
*H04W 24/06* (2009.01)

(52) U.S. Cl.
CPC .............. *H04W 24/00* (2013.01); *H04B 17/00* (2013.01); *H04W 24/06* (2013.01)
USPC ................... 455/67.14; 455/67.11; 455/226.2

(58) Field of Classification Search
None
See application file for complete search history.

(56) References Cited

U.S. PATENT DOCUMENTS 7,075,893 B1    7/2006  Mlinarsky et al.
2008/0311871 A1*  12/2008  Qi et al. ................... 455/226.2

(Continued)

FOREIGN PATENT DOCUMENTS

EP           2503713           9/2012

OTHER PUBLICATIONS

LitePoint, LitePoint IQ2010 Multi-Radio Test System, Jan. 2011.*

(Continued)

*Primary Examiner* — Ping Hsieh
*Assistant Examiner* — James Yang
(74) *Attorney, Agent, or Firm* — Treyz Law Group; Jason Tsai

(57) ABSTRACT

Radio frequency test systems for characterizing antenna performance in various radio coexistence scenarios are provided. In one suitable arrangement, a test system may be used to perform passive radio coexistence characterization. During passive radio coexistence characterization, at least one signal generator may be used to feed aggressor signals directly to antennas within an electronic device under test (DUT). The aggressor signals may generate undesired interference signals in a victim frequency band, which can then be received and analyzed using a spectrum analyzer. During active radio coexistence characterization, at least one radio communications emulator may be used to communicate with a DUT via a first test antenna. While the DUT is communicating with the at least one radio communications emulator, test signals may also be conveyed between DUT 10 and a second test antenna. Test signals conveyed through the second test antenna may be used in obtaining signal interference level measurements.

15 Claims, 10 Drawing Sheets

(56) References Cited

U.S. PATENT DOCUMENTS

| | | |
|---|---|---|
| 2011/0230143 A1* | 9/2011 | Lundstrom et al. ........ 455/67.11 |
| 2012/0053879 A1 | 3/2012 | Chang et al. |
| 2012/0100813 A1 | 4/2012 | Mow et al. |
| 2012/0207030 A1 | 8/2012 | Luong |

OTHER PUBLICATIONS

Agilent, Agilent intermodulation test, May 2012.*
ITU, ITU Report 946-1 on frequency planning, 1982-1990 http://www.itu.int/dms_pub/itu-r/opb/rep/R-REP-BS.946-1-1990-PDF-E.pdf.*

* cited by examiner

METHODS AND APPARATUS FOR PERFORMING COEXISTENCE TESTING FOR MULTI-ANTENNA ELECTRONIC DEVICES

BACKGROUND

This relates generally to wireless communications circuitry, and more particularly, to electronic devices that have wireless communications circuitry.

Electronic devices such as portable computers and cellular telephones are often provided with wireless communications capabilities. For example, electronic devices may use long-range wireless communications circuitry such as cellular telephone circuitry to communicate using cellular telephone bands. Electronic devices may use short-range wireless communications circuitry such as wireless local area network communications circuitry to handle communications with nearby equipment. Electronic devices may also be provided with satellite navigation system receivers and other wireless circuitry.

Antenna performance affects the ability of a user to take advantage of the wireless capabilities of an electronic device. If antenna performance is not satisfactory, calls may be dropped, data transfer rates may become undesirably low, or the time to acquire satellite navigation system fixes may be unacceptably long. To ensure that antenna performance meets design criteria, it may sometimes be desirable to provide an electronic device with multiple antennas. In some situations, control circuitry within a device may be able to switch between antennas to ensure that an optimum antenna is being used to handle call traffic.

Electronic devices with multiple antennas may be used to handle different types of wireless communications in parallel. For example, consider a scenario in which a multi-antenna device is attempting to use the long-range wireless communications circuitry to communicate in a first communications band while attempting to use the short-range wireless communications circuitry to communicate in a second communications band. In this scenario, it is possible that signals transmitted in the first communications band generate interference that degrades signal reception in the second communications band. High levels of interference among the different wireless communications circuitries can adversely impact wireless performance.

It may therefore be desirable to provide ways for characterizing the wireless performance of electronic devices in scenarios in which multiple wireless communications circuitries coexist.

SUMMARY

This relates generally to wireless electronic devices, and more particularly, to ways for testing wireless electronic devices. A wireless electronic device may be provided with wireless communications circuitry including transceivers operable in various frequency bands and multiple device antennas each of which can be used to transmit/receive radio-frequency signals for a respective one of the transceivers. For example, a wireless electronic device may include at least a first radio circuit operable to handle wireless communications in cellular telephone communications bands, a second radio circuit operable to handle wireless communications in wireless local area network communications bands, and a third radio circuit operable to handle wireless communications in satellite navigation communications bands. The first, second, and third radio circuits may transmit and/or receive radio-frequency (RF) signals using respective antennas in the electronic device.

It may be desirable to characterize the performance of a multi-antenna electronic device in which multiple radio circuits are operating in parallel to determine the effect that the operation of one or some of the radio circuits (sometimes referred to as aggressor radios) has on another radio circuit (sometimes referred to as a victim radio). The process of measuring the interference among multiple simultaneously operating radios within a single device under test (DUT) is sometimes referred to as radio coexistence characterization.

In one suitable arrangement of the present invention, a test system is provided that can be used to perform passive radio coexistence characterization. During passive radio coexistence testing, at least one RF signal generator may be used to generate aggressor signals in a first communications band that is associated with operation of a first radio in the DUT. Aggressor signals generated in this way may be fed directly to selected device antennas within the device under test (DUT) via a configurable switch circuit (e.g., by entirely bypassing the radio circuitry in the DUT). The aggressor signals may be amplified and selectively filtered prior to being fed to the device antennas.

The aggressor signals may in turn generate interference signals in a second communications band that is associated with operation of a second radio in the DUT. These interference signals may be received by a device antenna other than the selected antenna and may be measured using a tester such as a spectrum analyzer. The configurable switch circuit may determine from which device antenna the interference signals are being routed to the spectrum analyzer.

In another suitable arrangement of the present invention, a test system is provided that can be used to perform active radio coexistence characterization. During active radio coexistence testing, at least one radio-frequency tester (e.g., a base transceiver station emulator for cellular communications or an access point emulator for wireless local area network communications) may be used to generate test signals in a first communications band that is fed to the DUT via a first test antenna. In scenarios in which two radio-frequency testers generate test signals for transmission through the first test antenna, a frequency-based multiplexing circuit such as a duplexer may be interposed in the path between the two radio-frequency testers and the first test antenna.

While test signals are being transmitted to the DUT using the first test antenna (e.g., via a cellular telephone communications link or a wireless local area network communications link), another radio-frequency tester may be used to transmit additional test signals in a second communications band to the DUT via a second test antenna. Signals conveyed on the link between the DUT and the first test antenna may interact with other non-linear device components to generate interference signals in the second communications band. The second test antenna may be coupled to another RF tester via a configurable switch circuit. Path loss calibration techniques may be performed on the wireless path between the second test antenna and the DUT.

In yet another suitable arrangement, a test system that is used for performing active radio coexistence characterization may be provided. A DUT may be placed within an anechoic chamber. A single test antenna positioned within the anechoic chamber may be used to communicate with the DUT. The test antenna may be coupled to a plurality of RF testers (e.g., a base transceiver station emulator, a wireless location area network device emulator, and a satellite navigation system emulator) via a frequency-based multiplexing circuit such as an RF triplexer.

In each of the embodiments, the DUT may be placed within a radio-frequency test enclosure (e.g., an anechoic chamber, a reverberation chamber, a transverse electromagnetic cell, etc.). A positioner in the test enclosure may be used to vary the orientation of the DUT with respect to the test antenna(s) within the test enclosure. If desired, a phantom object may be placed in the vicinity of the DUT within the test enclosure to simulate various user scenarios.

Further features of the present invention, its nature and various advantages will be more apparent from the accompanying drawings and the following detailed description.

DETAILED DESCRIPTION

Figure 1:
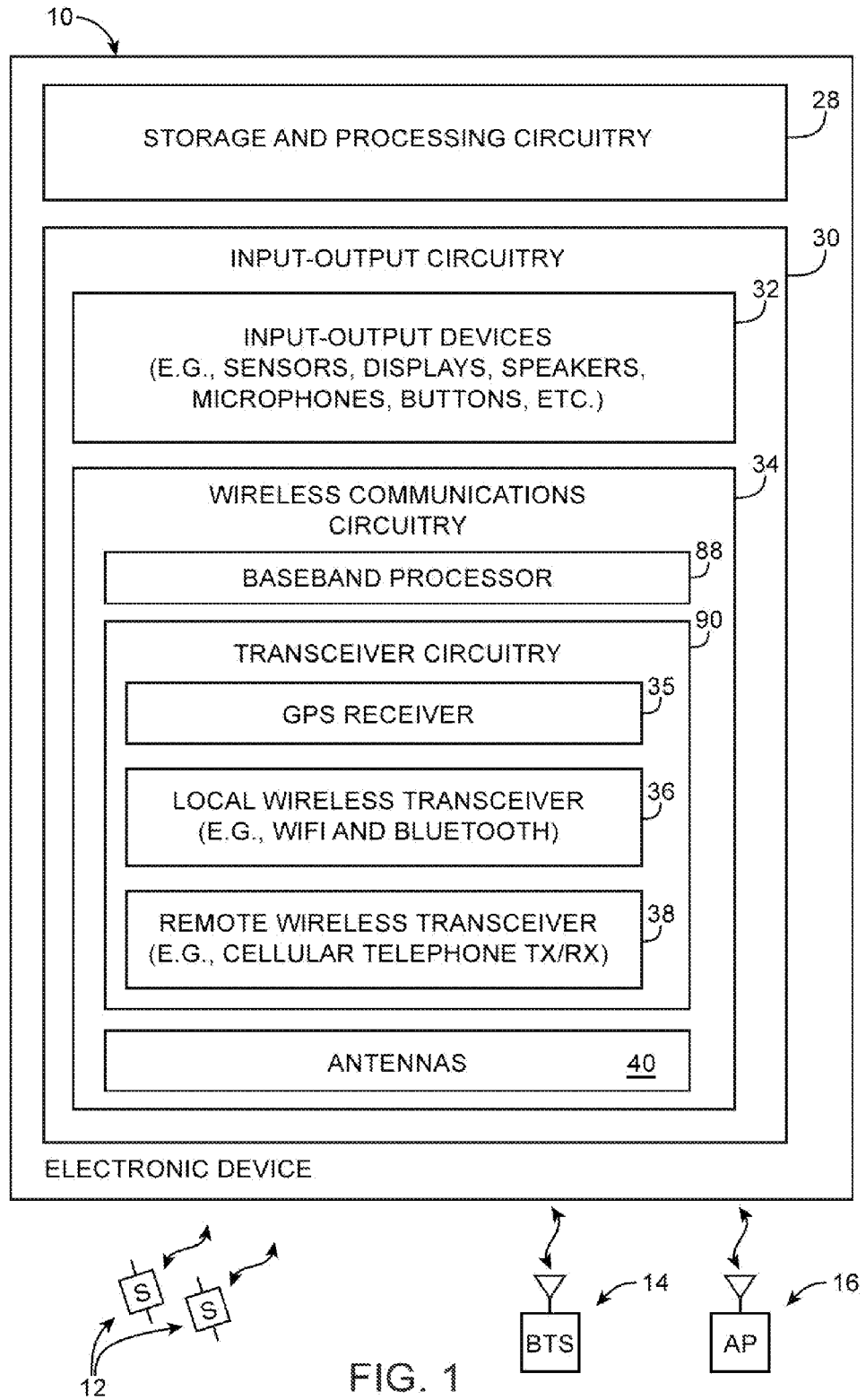
FIG. 1 is a schematic diagram of an illustrative wireless electronic device in accordance with an embodiment of the present invention.

Electronic devices such as device 10 of FIG. 1 may be provided with wireless communications circuitry. The wireless communications circuitry may be used to support long-range wireless communications such as communications in cellular telephone bands. Examples of long-range (cellular telephone) bands that may be handled by device 10 include the 800 MHz band, the 850 MHz band, the 900 MHz band, the 1800 MHz band, the 1900 MHz band, the 2100 MHz band, the 700 MHz band, and other bands. The long-range bands used by device 10 may include the so-called LTE (Long Term Evolution) bands. The LTE bands are numbered (e.g., 1, 2, 3, etc.) and are sometimes referred to as E-UTRA operating bands.

Device 10 may also receive long-range signals such as signals associated with satellite navigation bands. For example, device 10 may use wireless circuitry to receive signals in the 1575 MHz band associated with the Global Positioning System (GPS) and to receive signals in the 1602 MHz band associated with the Global Navigation Satellite System (GLONASS). Short-range wireless communications may also be supported by the wireless circuitry of device 10. For example, device 10 may include wireless circuitry for handling local area network links such as WiFi® links at 2.4 GHz and 5 GHz, Bluetooth® links at 2.4 GHz, etc.

As shown in FIG. 1, device 10 may include storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to a wireless local area network device run software on device 10, such as internet browsing applications, voice-over-internet-protocol (VOIP) telephone call applications, email applications, media playback applications, operating system functions, functions related to communications band selection during radio-frequency transmission and reception operations, etc. To support interactions with external equipment such as base station 21, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, IEEE 802.16 (WiMax) protocols, cellular telephone protocols such as the "2G" Global System for Mobile Communications (GSM) protocol, the "2G" Code Division Multiple Access (CDMA) protocol, the "3G" Universal Mobile Telecommunications System (UMTS) protocol, and the "4G" Long Term Evolution (LTE) protocol, MIMO (multiple input multiple output) protocols, antenna diversity protocols, etc. Wireless communications operations such as communications band selection operations may be controlled using software stored and running on device 10 (i.e., stored and running on storage and processing circuitry 28 and/or input-output circuitry 30).

Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, etc.

Input-output circuitry 30 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 90 may include transceiver circuitry 36, 38, and 35. Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as at 850 MHz, 900 MHz, 1800 MHz, 1900 MHz, and 2100 MHz and/or the LTE bands and other bands (as examples). Circuitry 38 may handle voice data and non-voice data traffic.

Transceiver circuitry 90 may include global positioning system (GPS) receiver equipment such as GPS receiver circuitry 35 for receiving GPS signals at 1575 MHz, GLONASS signals at 1602 MHz, signals associated with China's Compass also known as the Beidou Global navigation system at 1561 MHz, signals associated with Europe's Galileo positioning system at 1164 MHz, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include one or more antennas 40. Antennas 40 may be formed using any suitable antenna types. For example, antennas 40 may include antennas with resonating elements that are formed from loop antenna structure, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna.

As shown in FIG. 1, wireless communications circuitry 34 may also include baseband processor 88. Baseband processor may include memory and processing circuits and may also be considered to form part of storage and processing circuitry 28 of device 10.

Baseband processor 88 may be used to provide data to storage and processing circuitry 28. Data that is conveyed to circuitry 28 from baseband processor 88 may include raw and processed data associated with wireless (antenna) performance metrics for received signals such as received power, transmitted power, frame error rate, bit error rate, channel quality measurements based on received signal strength indicator (RSSI) information, channel quality measurements based on received signal code power (RSCP) information, channel quality measurements based on reference symbol received power (RSRP) information, channel quality measurements based on signal-to-interference ratio (SINR) and signal-to-noise ratio (SNR) information, channel quality measurements based on signal quality data such as Ec/Io or Ec/No data, information on whether responses (acknowledgements) are being received from a cellular telephone tower corresponding to requests from the electronic device, information on whether a network access procedure has succeeded, information on how many re-transmissions are being requested over a cellular link between the electronic device and a cellular tower, information on whether a loss of signaling message has been received, information on whether paging signals have been successfully received, and other information that is reflective of the performance of wireless circuitry 34. This information may be analyzed by storage and processing circuitry 28 and/or processor 88 and, in response, storage and processing circuitry 28 (or, if desired, baseband processor 58) may issue control commands for controlling wireless circuitry 34. For example, baseband processor 88 may issue commands that direct transceiver circuitry 90 to switch into use desired transmitters/receivers and antennas.

Antenna diversity schemes may be implemented in which multiple redundant antennas are used in handling communications for a particular band or bands of interest. In an antenna diversity scheme, storage and processing circuitry 28 may select which antenna to use in real time based on signal strength measurements or other data. In multiple-input-multiple-output (MIMO) schemes, multiple antennas may be used in transmitting and receiving multiple data streams, thereby enhancing data throughput.

As shown in FIG. 1, device 10 may communicate with wireless network equipment such as satellites 12 using receiver 35, base station (or base transceiver station) 14 using transceiver 38, access point 16 using transceiver 36, and other wireless network devices. Satellites 12 may, as an example, be Global Positioning System (GPS) satellites. Base station 14 may be associated with a cellular telephone network, whereas access point 16 may be associated with a wireless local area network (WLAN). Device 10 may communicate with these network devices over respective wireless communications links.

Figure 2:
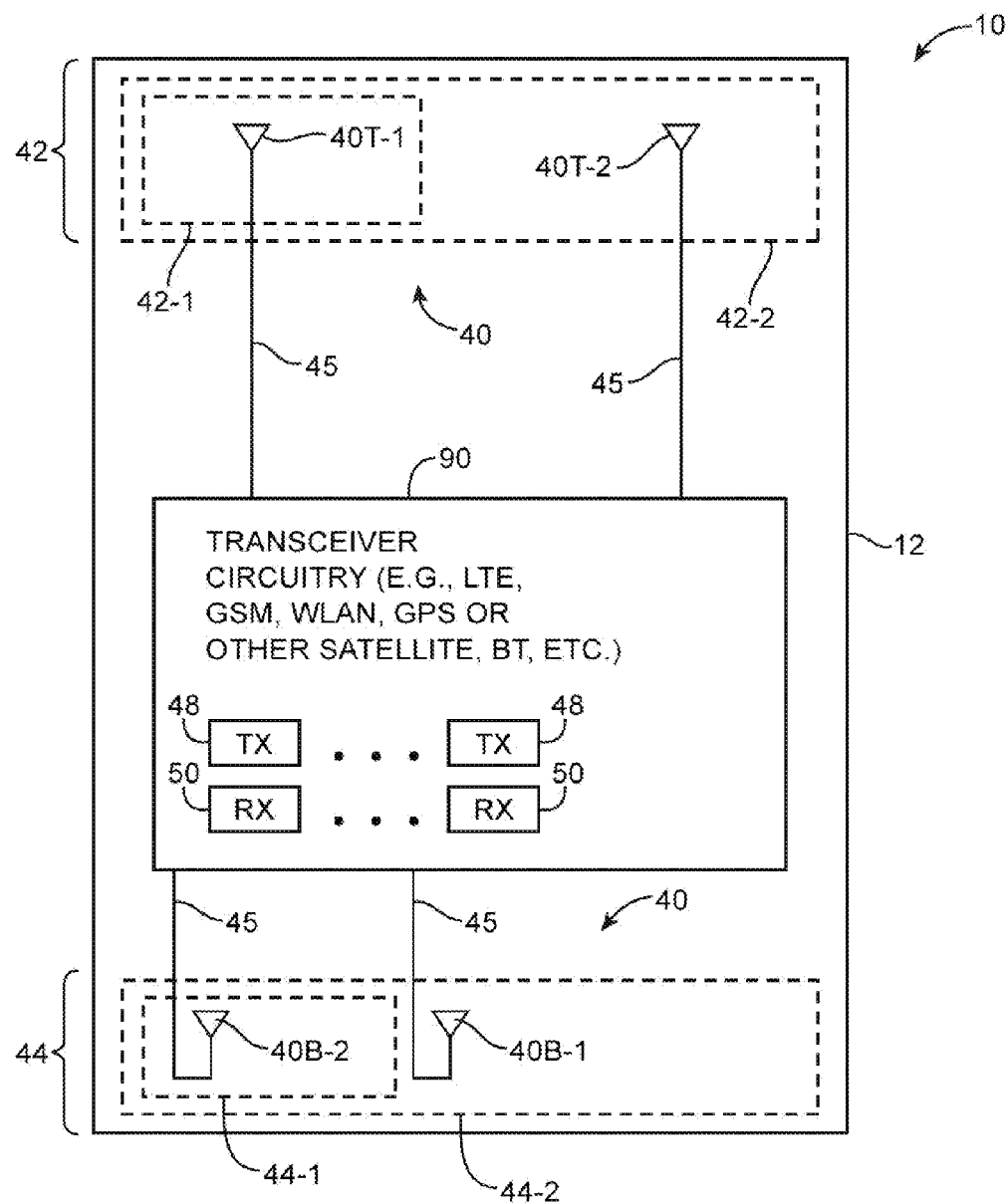
FIG. 2 is a diagram showing how radio-frequency transceiver circuitry may be coupled to one or more antennas within an electronic device of the type shown in FIG. 1 in accordance with an embodiment of the present invention.

Illustrative locations in which antennas 40 may be formed in device 10 are shown in FIG. 2. As shown in FIG. 2, electronic device 10 may have a housing such as housing 12. Housing 12 may include plastic walls, metal housing structures, structures formed from carbon-fiber materials or other composites, glass, ceramics, or other suitable materials. Housing 12 may be formed using a single piece of material (e.g., using a unibody configuration) or may be formed from a frame, housing walls, and other individual parts that are assembled to form a completed housing structure. The components of device 10 that are shown in FIG. 1 may be mounted within housing 12. Antenna structures 40 may be mounted within housing 12 and may, if desired, be formed using parts of housing 12. For example, housing 12 may include metal housing sidewalls, peripheral conductive members such as band-shaped members (with or without dielectric gaps), conductive bezels, and other conductive structures that may be used in forming antenna structures 40.

As shown in FIG. 2, antenna structures 40 may be coupled to transceiver circuitry 90 by paths such as paths 45. Paths 45 may include transmission line structures such as coaxial cables, microstrip transmission lines, stripline transmission lines, etc. Impedance matching circuitry, filter circuitry, and switching circuitry may be interposed in paths 45 (as examples). Impedance matching circuitry may be used to ensure that antennas 40 are efficiently coupled to transceiver circuitry 90 in desired frequency bands of interest. Filter circuitry may be used to implement frequency-based multiplexing circuits such as diplexers, duplexers, and triplexers. Switching circuitry may be used to selectively couple antennas 40 to desired ports of transceiver circuitry 90. For example, a switch may be configured to route one of paths 45 to a given antenna in one operating mode. In another operating mode, the switch may be configured to route a different one of paths 45 to the given antenna. The use of switching circuitry between transceiver circuitry 90 and antennas 40 allows device 10 to switch particular antennas 40 in and out of use depending on the current performance associated with each of the antennas.

In a device such as a cellular telephone that has an elongated rectangular outline, it may be desirable to place antennas 40 at one or both ends of the device. As shown in FIG. 2, for example, some of antennas 40 may be placed in upper end region 42 of housing 12 and some of antennas 40 may be placed in lower end region 44 of housing 12. The antenna structures in device 10 may include a single antenna in region 42, a single antenna in region 44, multiple antennas in region 42, multiple antennas in region 44, or may include one or more antennas located elsewhere in housing 12.

Antenna structures 40 may be formed within some or all of regions such as regions 42 and 44. For example, an antenna such as antenna 40T-1 may be located within region 42-1 or an antenna such as antenna 40T-2 may be formed that fills some or all of region 42-2. Similarly, an antenna such as antenna 40B-1 may fill some or all of region 44-2 or an antenna such as antenna 40B-2 may be formed in region 44-1. These types of arrangements need not be mutually exclusive. For example, region 44 may contain a first antenna such as antenna 40B-1 and a second antenna such as antenna 40B-2.

Transceiver circuitry 90 may contain transmitters such as radio-frequency transmitters 48 and receivers such as radio-frequency receivers 50. Transmitters 48 and receivers 50 may be implemented using one or more integrated circuits (e.g., cellular telephone communications circuits, wireless local area network communications circuits, circuits for Bluetooth® communications, circuits for receiving satellite navigation system signals, power amplifier circuits for increasing transmitted signal power, low noise amplifier circuits for increasing signal power in received signals, other suitable wireless communications circuits, and combinations of these circuits).

Electronic device 10 having multiple antennas 40 (sometimes referred to as a multi-antenna device) may be used to simultaneously transmit and receive radio-frequency signals in multiple radio-frequency bands using long-range wireless communications circuitry and/or short-range wireless communications circuitry. Such types of scenarios in which transceivers that are responsible for handing different types of radio access technologies coexist (i.e., scenarios in which multiple transceivers transmit and receive wireless signals in separate radio-frequency bands in parallel) may sometimes be referred to as radio "coexistence" scenarios. When multiple transceivers coexist and operate simultaneously, it is possible that signals associated with one or more transceivers interfere with signals associated with another transceiver. Wireless radio circuitry responsible for generating the interference signals may be referred to as "aggressors," whereas wireless radio circuitry whose performance suffers as a result of aggressor interference may be referred to as "victims."

Figure 3:
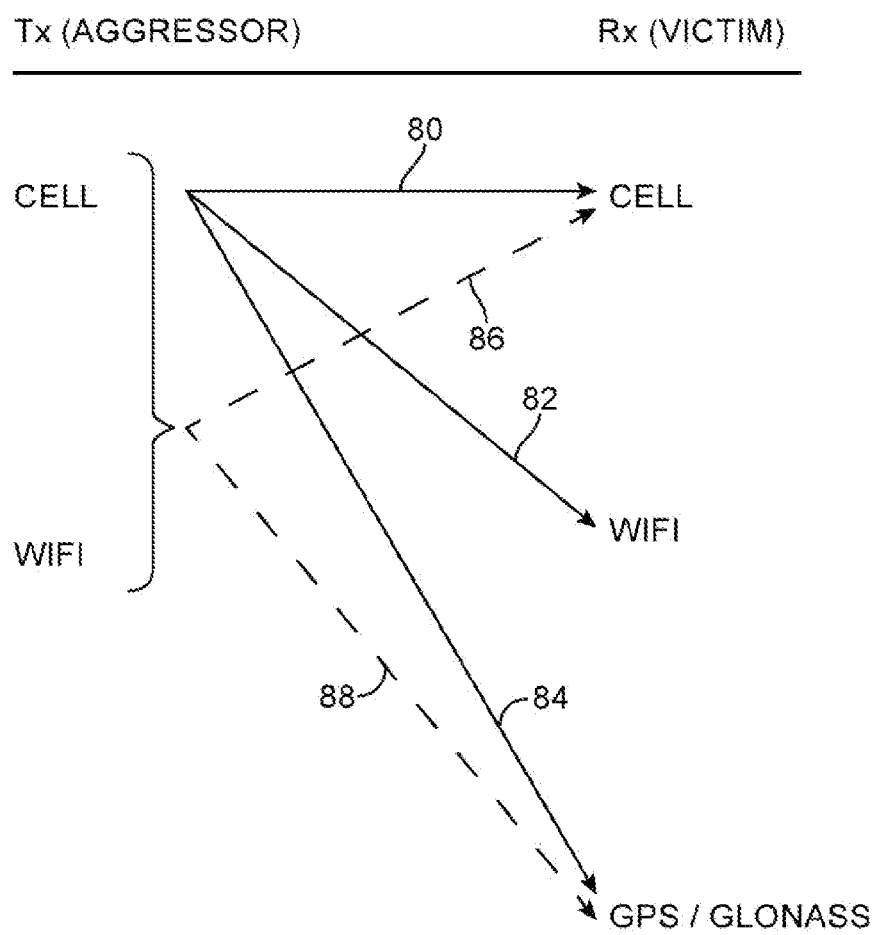
FIG. 3 is a diagram showing various radio coexistence scenarios in accordance with an embodiment of the present invention.

FIG. 3 is a diagram showing exemplary coexistence scenarios involving various aggressors and victims. As shown in FIG. 3, cellular telephone transceiver 38 may transmit aggressor signals that degrade the receive performance of itself (as indicated by arrow 80), local area network wireless transceiver 36 (as indicated by arrow 82), and satellite navigation receiver 35 (as indicated by arrow 84).

As an example corresponding to arrow 80, cellular telephone transceiver 38 transmitting signals in the $3^{rd}$ Generation Partnership Project (3GPP) frequency band VIII (i.e., at 900 MHz) may generate second harmonic aggressor signals that degrade cellular reception in 3GPP band III (i.e., at 1800 MHz).

As another example corresponding to arrow 82, transceiver 38 transmitting signals in 3GPP band II (i.e., at 1900 MHz) may generate third harmonic aggressor signals that degrade WiFi® reception at 5.8 GHz.

As another example corresponding to arrow 84, transceiver 38 transmitting signals in 3GPP band XIII (i.e., at 700 MHz) may generate second harmonic aggressor signals that degrade GPS/GLONASS reception at around 1600 MHz. In general, cellular transceiver circuitry 38 may serve as a lone aggressor that generates harmonic distortion signals that interfere with one of the victim wireless circuitries (e.g., with itself, local area network wireless transceiver 36, or satellite navigation receiver 35).

In other scenarios, cellular telephone transceiver 38 and local wireless area network transceiver 36 (e.g., a WiFi® transceiver) may serve as joint aggressors that transmit signals in two different frequency bands, thereby generating undesired spurious emissions at frequencies other than at harmonic frequencies. This phenomenon in which spurious signals are generated at frequencies other than at harmonic frequencies is sometimes referred to as intermodulation distortion (IMD). As illustrated in FIG. 3, transceivers 36 and 38 may transmit aggressor signals that generate IMD signals that degrade the receive performance of cellular telephone transceiver 38 (as indicated by arrow 86) and satellite navigation receiver 35 (as indicated by arrow 88).

As an example corresponding to arrow 86, transceiver 38 transmitting signals in 3GPP band II (i.e., at 1900 MHz) and transceiver 36 transmitting signals in the 5.8 GHz WiFi® communications band may generate third-order intermodulation distortion signals (sometimes referred to as IMD3 product terms) that degrade cellular reception in 3GPP band II (5.8 minus 2*1.9 falls close to band II).

As another example corresponding to arrow 88, transceiver 38 transmitting signals in LTE E-UTRA band III (i.e., at 1800 MHz) and transceiver 36 transmitting signals in the 5 GHz WiFi® communications band may generate IMD3 aggressor signals that degrade GPS reception (5 minus 2*1.8 is relatively close to 1575 MHz). As another example, transceiver 38 transmitting signals in 3GPP band V (i.e., at 850 MHz) and transceiver 36 transmitting signals in the 2.4 GHz Bluetooth® communications band may generate second-order intermodulation (IMD2) aggressor signals that degrade GPS reception (2400 minus 850 is relatively close to 1575 MHz).

The different coexistence scenarios shown and described in connection with FIG. 3 are merely illustrative and do not serve to limit the scope of the present invention. In general, device 10 may include any number of wireless circuitry, each of which may serve as an aggressor and/or a victim. Because interference among the different transceivers can degrade wireless performance, it may be desirable to provide a way of characterizing the level of interference generated during the different possible coexistence scenarios.

Figure 4:
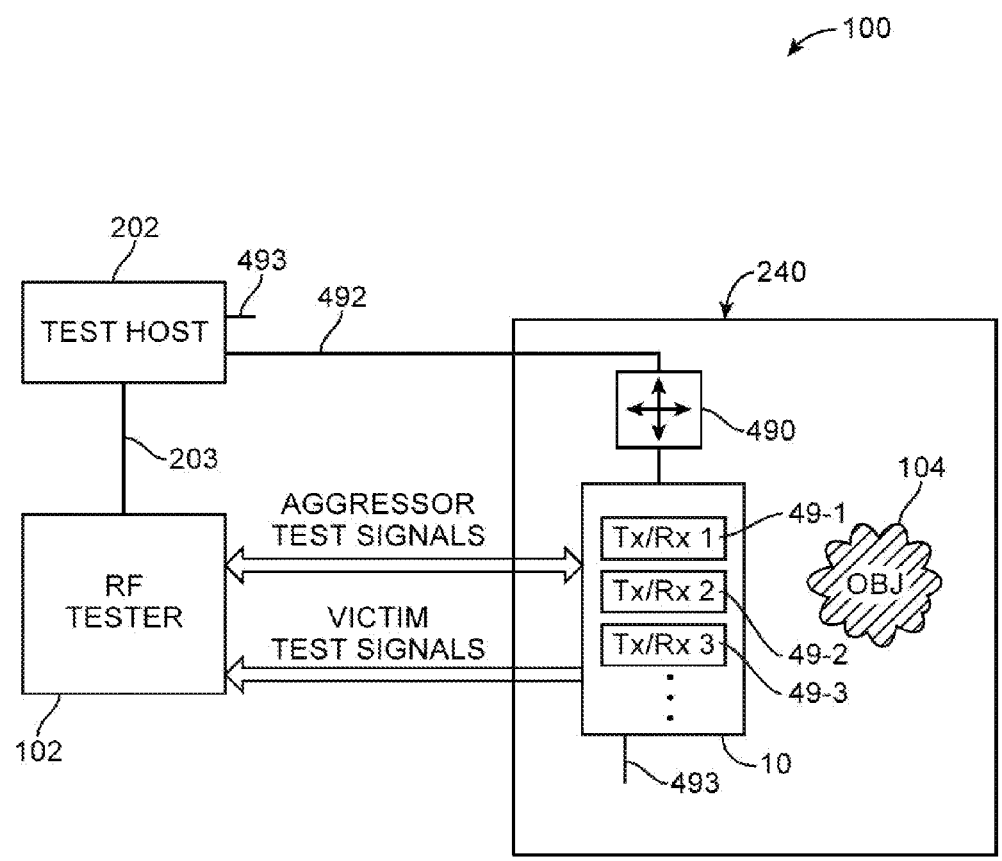
FIG. 4 is a diagram of an illustrative test system for characterizing radio coexistence scenarios for a wireless electronic device in accordance with an embodiment of the present invention.

FIG. 4 is a high-level diagram of an illustrative test system 100 for use in characterizing wireless coexistence performance for a multi-antenna electronic device 10. An electronic device 10 that is being tested in radio-frequency (RF) test system 100 may sometimes be referred to as a device under test (DUT). As shown in FIG. 4, test system 100 may include a test host 202, a radio-frequency tester 102, and a test enclosure 240 within which a DUT can be placed during testing. Test host 202 may be a personal computer or a network of computers configured to direct the operation of tester 102 (e.g., by sending commands to tester 102 via path 203) and for gathering desired test data.

Tester 102 may be a signal generator, a spectrum analyzer, a vector network analyzer, or other testers suitable for generating radio-frequency test signals and for performing radio-frequency measurements on signals received from DUT 10. In some suitable arrangements, tester 102 may be a radio communications tester of the type that is sometimes referred to as a call box, a base station emulator to test the ability of transceiver 38 in supporting cellular telephone communications protocols, a wireless access point emulator to test the ability of transceiver 36 in supporting the wireless local area network communications protocols and/or other short-range wireless protocols, a satellite navigation system emulator to test the ability of receiver 35 in supporting satellite navigation communications protocols, or other types of network device emulator. Tester 102 may, for example, be the CMU200 Universal Radio Communication Tester available from Rohde & Schwarz.

Tester 102 may be operated directly or via computer control. When operated directly, a user may control tester 102 by supplying commands directly to the signal generator using the user input interface of tester 102. For example, a user may press buttons in a control panel on the signal generator while viewing information that is displayed on a display in tester 102. In computer controlled configurations, test host 202 (e.g., software running autonomously or semi-autonomously on the computer) may communicate with tester 102 by sending and receiving data over wired path 203 or a wireless path between the computer and the signal generator (as an example).

During wireless testing, DUT 10 may be placed within test enclosure 240. DUT 10 may optionally be coupled to test host 202 via a control line 493. The connection represented by line 493 may be a Universal Serial Bus (USB) based connection, a Universal Asynchronous Receiver/Transmitter (UART) based connection, or other suitable types of connection. During testing, test host 202 may send control signals to DUT 10 and may retrieve test data from DUT 10 via connection 493. DUT 10 need not be electrically connected to test host 202.

Test enclosure 240 may be a shielded enclosure that can be used to provide radio-frequency isolation when performing electromagnetic compatibility (EMC) radiated tests without experiencing interference from outside environment. The interior of test enclosure 240 may be lined with radio-frequency absorption material such as rubberized foam configured to minimize reflections of wireless signals. In one suitable embodiment, test enclosure 240 may be a test cell sometimes referred to as a transverse electromagnetic (TEM) cell that includes in its interior wireless structures for communicating over short distances using near field electromagnetic coupling (e.g., over ten centimeters or less). In another suitable embodiment, test enclosure 240 may be a test chamber such as an anechoic chamber or a reverberation chamber that includes in its interior wireless structures for conveying test radio-frequency signals over relatively longer distances (e.g., over 5 meters or more, 10 meters or more, 50 meters or more, etc.).

DUT 10 may, for example, include at least a first wireless communications circuit (or radio) 49-1 operable to handle radio-frequency signals using a first radio access technology, a second wireless communications circuit 49-2 operable to handle radio-frequency signals using a second radio access technology that is different than the first radio access technology, and a third wireless communications circuit 49-3 operable to handle radio-frequency signals using a third radio access technology that is different than the first and second radio access technologies.

Wireless transceiver circuits that are capable of transmitting and receiving radio-frequency signals can potentially serve as wireless aggressors and/or victims (e.g., it is possible for a transceiver to be both an aggressor and a victim), whereas wireless communications circuits that are only capable of receiving radio-frequency signals are only able to serve as wireless victims. As shown in FIG. 4, aggressor test signals may be conveyed between tester 102 and at least one of the wireless communications circuits 49 in DUT 10 while tester 102 may receive victim test signals from a corresponding victim wireless communications circuit in DUT 10.

During radio coexistence testing, DUT 10 may be attached to a positioner such as positioner 490 when DUT 10 is placed within test enclosure 240. Positioner 490 is a computer-controlled or manually-controlled positioning device that can be used to change the position/orientation of DUT 10 within test enclosure 240 during testing. For example, positioner 490 may include actuators for controlling lateral and/or rotational movement of DUT 10 and may therefore sometimes be referred to as a DUT rotator. DUT rotator 490 may be controlled using control signals generated by test host 202 routed over path 492.

If desired, a physical object such as object 104 may be placed in the vicinity of DUT 10 during testing. The presence of object 104 may serve to simulate an actual user scenario in which a users hand or other body part(s) may impact the antenna performance of DUT 10. Object 104 may therefore sometimes be referred to as a phantom object. Positioner 490 may be used to vary the position and orientation of DUT 10 relative to object 104 during device characterization. If desired, object 104 may be formed using dielectric material, metal, ceramic, plastic, rubber, foam, or other suitable material. If desired, the position/orientation of object 104 may also be adjusted manually or automatically (via commands from test host 202) during testing.

Figure 5:
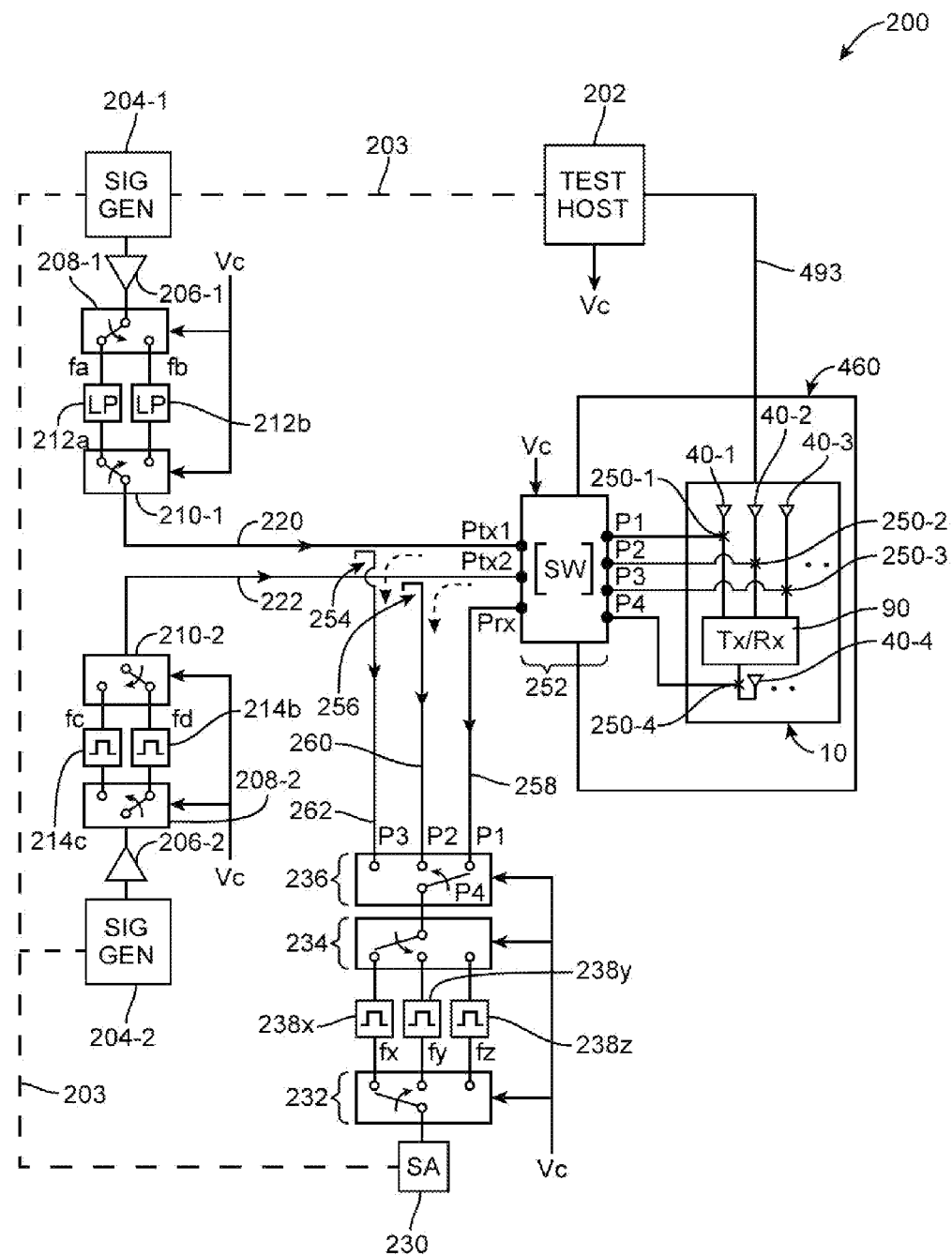
FIG. 5 is a diagram of an illustrative test system for performing passive radio coexistence characterization in accordance with an embodiment of the present invention.

FIG. 5 shows one suitable arrangement of a test system 200 that is configured to perform passive radio coexistence characterization. During passive testing, transceiver circuitry 90 in DUT 10 is bypassed by coupling test signals directly to the different antennas 40 while transceiver circuitry 90 is placed in inactive mode. As shown in FIG. 5, radio-frequency test system 200 may include test host 202, test enclosure 460, switching circuitry 252, a first signal generator 204-1, a second signal generator 204-2, a spectrum analyzer 230, cabling, and other associated test equipment. If desired, a phantom object such as object 104 may be placed in the vicinity of DUT 10 during passive radio coexistence testing (see, e.g., FIG. 4). Testers such as signal generators 204-1 and 204-2 and spectrum analyzer 230 may receive commands from test host 202 via path 203.

DUT 10 having multiple antennas 40 may be placed within test enclosure 240 during characterization operations. In the example of FIG. 5, DUT 10 includes transceiver circuitry 90 that is coupled to a first antenna 40-1 via a first transmission line path, a second antenna 40-2 via a second transmission line path, a third antenna 40-3 via a third transmission line path, and a fourth antenna 40-4 via a fourth transmission line path. Antenna 40-4 may be formed in a lower end region 44 of DUT 10, whereas antennas 40-1, 40-2, and 40-3 may be formed in an upper end region 42 of DUT 10 (see, e.g., FIG. 2). Antennas 40 (e.g., antennas 40-1, 40-2, 40-3, and 40-4) may each be used to transmit and/or receive signals for a selected one of remote wireless transceiver 38, local wireless area network transceiver 36, and GPS receiver 35. This is merely illustrative. In general, DUT 10 may include any suitable number of antennas formed in desired regions within DUT 10 for use in supporting any number of radio access technologies.

During passive coexistence characterization, DUT 10 may be coupled to configurable switching circuitry 252 via respective radio-frequency cables to perform conducted testing. Switching circuitry 252 may have a first antenna port P1 that is coupled to a first switch connector 250-1 interposed in the first transmission line path between antenna 40-1 and transceiver circuitry 90 via a first radio-frequency test cable, a second antenna port P2 that is coupled to a second switch connector 250-2 interposed in the second transmission line path between antenna 40-2 and transceiver circuitry 90 via a second radio-frequency test cable, a third antenna port P3 that is coupled to a third switch connector 250-3 interposed in the third transmission line path between antenna 40-3 and transceiver circuitry 90 via a third radio-frequency test cable, and a fourth antenna port P4 that is coupled to a fourth switch connector 250-4 interposed in the fourth transmission line path between antenna 40-4 and transceiver circuitry 90 via a fourth radio-frequency test cable.

When the switch connectors are mated with the corresponding test cables, antennas 40 are effectively decoupled from transceiver circuitry 90. For example, signals received using antenna 40-1 will be fed to port P1 of switching circuitry 252 via first switch connector 250-1 without being conveyed to transceiver circuitry 90. Similarly, antenna 40-1 will only be able to transmit signals coming from port P1 of switching circuitry 252 instead of signals coming from transceiver circuitry 90. The switch connectors are therefore sometimes referred to as transceiver bypass circuits.

Switching circuitry 252 may also include a first test transmit port Ptx1, a second test transmit port Ptx2, and a test receive port Prx. Switching circuitry 252 may be configured to couple port Ptx1 to a selected one of ports P1-P4, to couple port Ptx2 to another one of ports P1-P4, and/or to couple port Prx to yet another one of ports P1-P4 (e.g., ports Ptx1, Ptx2, and Prx should not share a common antenna port). Circuitry 252 may be controlled using control signals Vc generated using test host 202 and is sometimes referred to as a switch matrix.

First signal generator 204-1 may be coupled to port Ptx1 of circuitry 252 via transmit path 220. First signal generator 204-1 may, for example, be used to generate aggressor signals in the cellular telephone bands. Radio-frequency test signals produced using generator 204-1 may be amplified using power amplifier 206-1. The amplified test signals may then be fed through a selected low-pass filter to port Ptx1 (e.g., through one of low-pass filters 212a and 212b) via the use of associated switching circuits 208-1 and 210-1.

Low-pass filter 212a may have a cutoff frequency fa (i.e., signals exhibiting frequencies greater than fa will be attenuated) that is switched into use when generator 204-1 is producing test signals in low-frequency cellular telephone bands (e.g., a first lower frequency band that covers the GSM sub-bands at 850 MHz and 900 MHz, and a second lower frequency band that covers the LTE band at 700 MHz, the GSM sub-bands at 710 MHz and 750 MHz, the UMTS sub-band at 700 MHz, etc.). Cutoff frequency fa may be equal to 1200 MHz (as an example).

Alternatively, low-pass filter 212b may have a cutoff frequency fb (i.e., signals exhibiting frequencies greater than fb will be attenuated) that is switched into use when generator 204-1 is producing test signals in high-frequency cellular telephone bands (e.g., a higher frequency band that covers the GSM sub-bands at 1800 MHz and 1900 MHz and the data sub-band at 2100 MHz). Cutoff frequency fb may be equal to 2300 MHz (as an example).

Switches 208-1 and 210-1 may be single-pole double-throw radio-frequency switches that are used to selectively switch one of filters 212a and 212b into use while switching the other filter out of use. Switches 208-1 and 210-1 may be controlled based on signals Vc generated using test host 202. If desired, more than two low-pass filters may be interposed in path 220 to selectively attenuate high frequency signals. For example, in scenarios in which three low-pass filters 212 are used, switches 208-1 and 210-1 may be single-pole triple-throw radio-frequency switches. As another example, in scenarios n which four low-pass filters 212 are used, switches 208-1 and 210-1 may be single-pole quadruple-throw radio-frequency switches.

Second signal generator 204-2 may be coupled to port Ptx2 of circuitry 252 via transmit path 222. Second signal generator 204-2 may, for example, be used to generate aggressor signals in the 2.4 GHz or 5 GHz WiFi® communications band. Radio-frequency test signals produced using generator 204-2 may be amplified using power amplifier 206-2. The amplified test signals may then be fed through a selected band-pass filter (e.g., one of band-pass filters 214c and 214d) via the use of associated switching circuits 208-2 and 210-2 to port Ptx2.

Band-pass filter 214c may have a center frequency fc (i.e., signals near frequency fc will not be attenuated) that is switched into use when generator 204-2 is producing test signals near an fc of 2.4 GHz. On the other hand, band-pass filter 214d may have a center frequency fd (i.e., signals near frequency fd will not be attenuated) that is switched into use when generator 204-2 is producing test signals near an fd of 5 GHz.

Switches 208-2 and 210-2 may be single-pole double-throw radio-frequency switches that are used to selectively switch one of filters 214c and 214d into use while switching the other filter out of use. Switches 208-2 and 210-2 may be controlled based on signals Vc generated using test host 202. If desired, more than two band-pass filters may be interposed in path 222 to selectively pass through radio-frequency signals. For example, in scenarios in which three band-pass filters 214 are used, switches 208-2 and 210-2 may be single-pole triple-throw radio-frequency switches.

Spectrum analyzer 230 may be configured to receive test signals associated with the victim radio via a selected one of ports Ptx1, Ptx2, and Prx. In the example of FIG. 5, spectrum analyzer 230 may receive test signals using a radio-frequency switch 236 (e.g., a single-pole triple-throw radio-frequency switch) having a first receive port P1 that is coupled to Prx via path 258, a second receive port P2 that is coupled to Ptx2 via radio-frequency coupler 256 and path 260, a third receive port P3 that is coupled to Ptx1 via radio-frequency coupler 254 and path 262, and a fourth port P4 that can be selectively coupled to one of ports P1-P3 in switch 236. Signals arriving at port P4 of switch 236 may then be fed through a selected band-pass filter (e.g., one of band-pass filters 238x, 238y, and 238z) via the use of associated switching circuits 234 and 232.

Band-pass filter 238x may have a center frequency fx for passing through signals in the cellular telephone bands. Band-pass filter 238y may have a center frequency fy for passing through signals in the WiFi® communications bands. Band-pass filter 238z may have a center frequency fz for passing through signals in the GPS/GLONASS bands. Since there are three filters 238 (i.e., filters 238x, 238y, and 238z), switches 234 and 232 may be single-pole triple-throw radio-frequency switches that are used to selectively switch a selected one of filters 238 into use. Switches 236, 234, and 232 may be controlled using signals Vc generated from test host 202. If desired, more than three or less than three band-pass filters may be used to selectively pass through victim radio-frequency signals.

The example of FIG. 5 in which filters 212a and 212b used in conjunction with signal generator 204-1 are low-pass filter, in which filters 214c and 214d used in conjunction with signal generator 204-2 are band-pass filters, and in which filters 238x-z used in conjunction with spectrum analyzer 230 are band-pass filters is merely illustrative and does not serve to limit the scope of the present invention. If desired, any of these filters may be implemented using low-pass filters, band-pass filters, high-pass filters, notch filters, or other types of filters that provide the desired filtering function.

Figure 6:
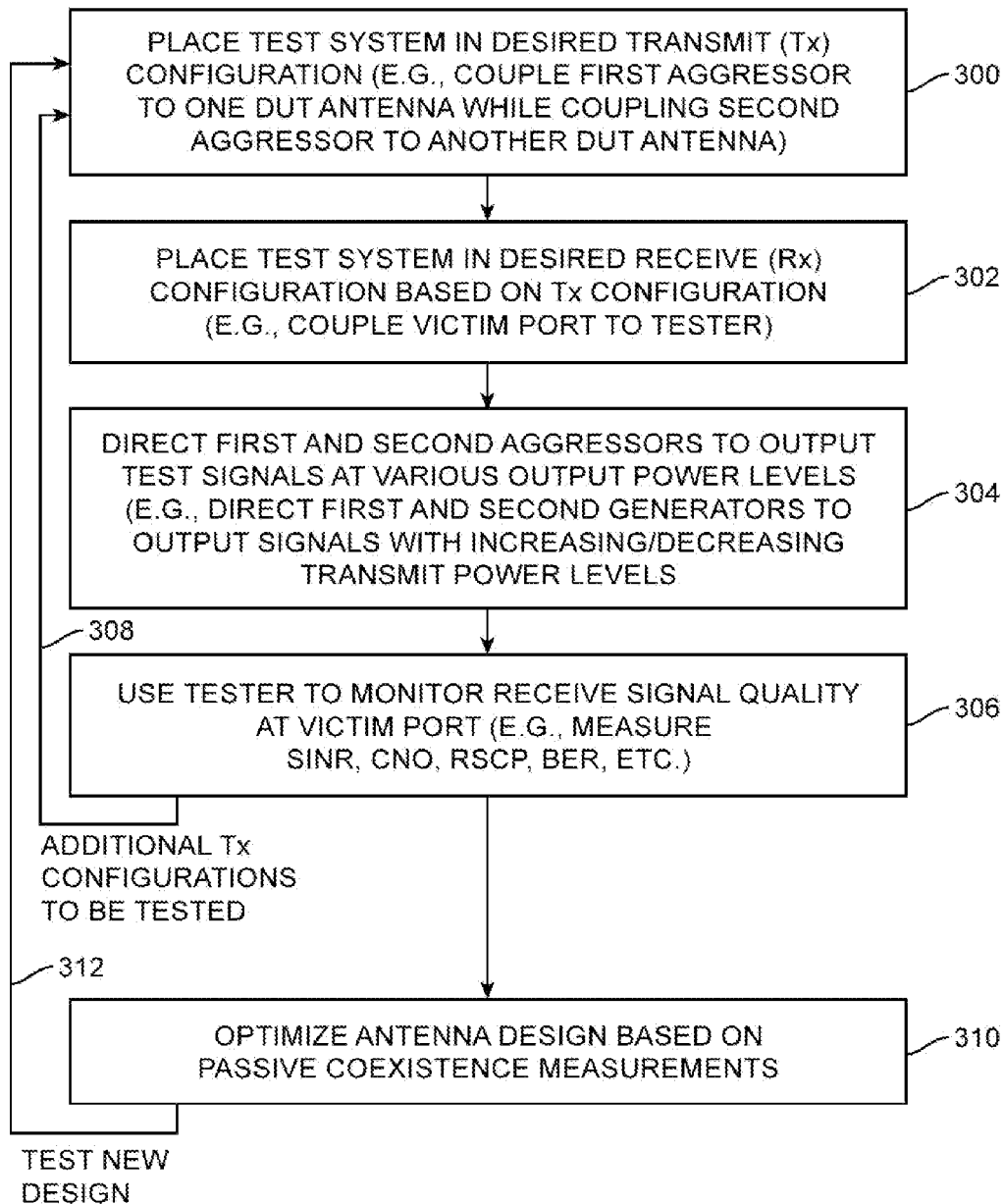
FIG. 6 is a flow chart of illustrative steps involved in performing passive radio coexistence characterization in accordance with an embodiment of the present invention.

FIG. 6 is a flow chart of illustrative steps for using test system 200 to perform passive radio coexistence characterization. At step 300, test system 200 may be placed in the desired transmit configuration by coupling signal generator 204-1 to a first DUT antenna and/or by coupling signal generator 204-2 to a second DUT antenna via switch matrix 252 (e.g., via the use of switch connectors to bypass the radio circuits). Signal generator 204-1 and 204-2 need not both be in use simultaneously.

At step 302, system 300 may be placed in the desired receive configuration based on the transmit configuration selected for testing during step 300. For example, spectrum analyzer 230 may either be coupled to port Ptx1 if victim signals are generated in radio-frequency bands associated with operation of the first DUT antenna, to port Ptx2 if victim signals are generated in radio-frequency bands associated with operation of the second DUT antenna, or to port Prx if victim signals are generated in radio-frequency bands associated with operation of an additional DUT antenna other than the first and second DUT antennas (i.e., the additional antenna may be coupled to port Prx).

At step 304, signal generators 204-1 and 204-2 may be used to output aggressor signals at various output power levels (e.g., test host 202 may direct signal generators 204-1 and 204-2 to output radio-frequency test signals with increasing and/or decreasing frequencies and/or power levels).

At step 306, spectrum analyzer 230 may be used to monitor receive signal quality for the victim radio band. As examples, spectrum analyzer 230 may be configured to measure the interferer power that can be translated to SINR, RSCP, carrier-to-noise (CNO) ratio, bit error rate (BER), and other radio-frequency performance metrics for characterizing interference in the victim band.

Figure 7:
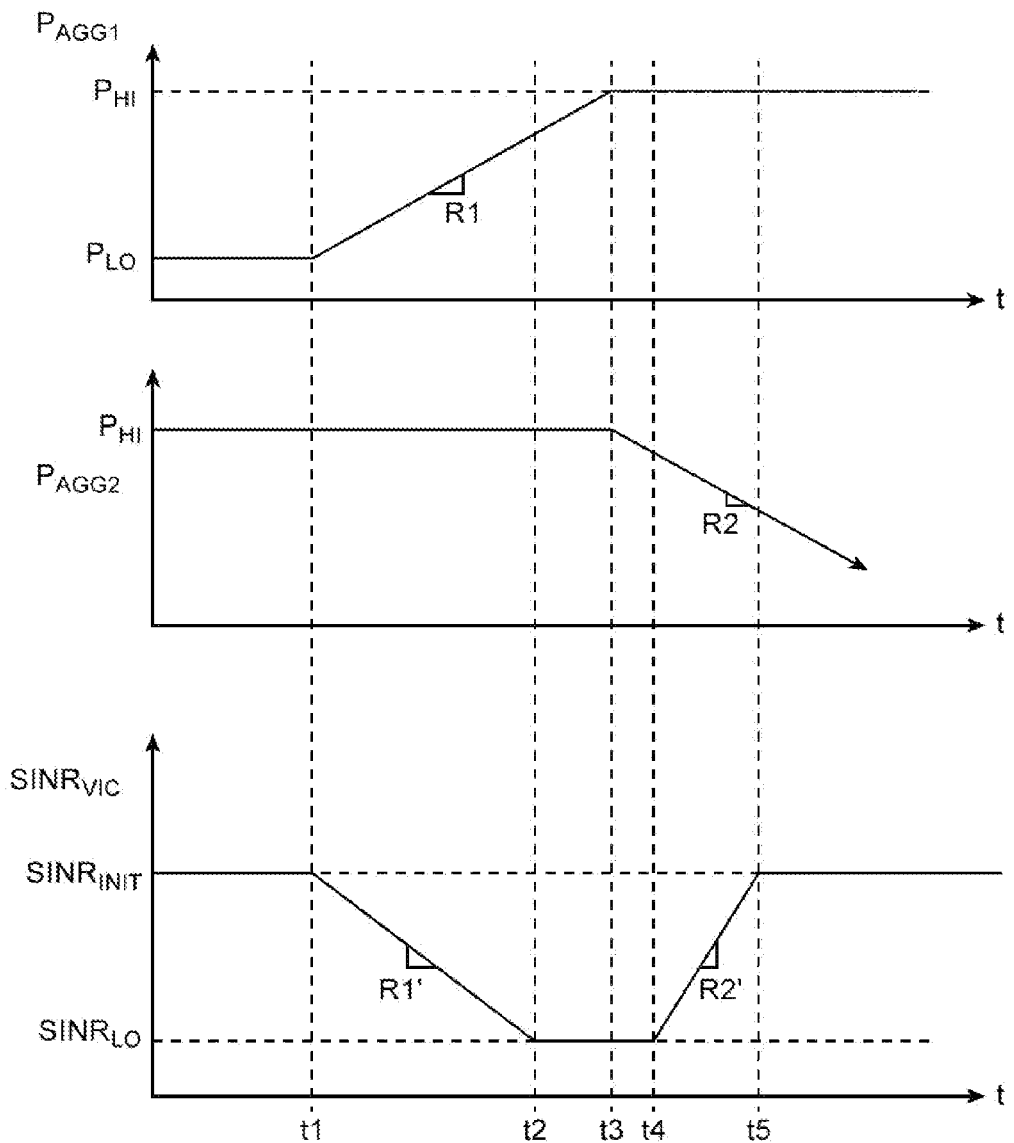
FIG. 7 shows plots of radio-frequency measurements that can be gathered during radio coexistence characterization operations in accordance with an embodiment of the present invention.

FIG. 7 illustrates one embodiment of the present invention in which tester 230 is used to measure SINR while the output power levels of generators 204-1 and 204-2 are being adjusted. As shown in FIG. 7, the output power of signal generator 204-1 (indicated as $P_{AGG1}$) is initiated to a low power level $P_{LO}$, whereas the output power of signal generator 204-2 (indicated as $P_{AGG2}$) is initiated to a high power level $P_{HI}$ prior to time t1. While $P_{AGG1}$ is at $P_{LO}$ and while $P_{AGG2}$ is at $P_{HI}$, tester 230 may detect an SINR measurement of $SINR_{INIT}$ in the victim band (i.e., $SINR_{VIC}$ may be equal to $SINR_{INIT}$).

At time t1, signal generator 204-1 may be adjusted such that $P_{AGG1}$ begins to rise at a rate of R1. Rising aggressors signals will typically result in elevated levels of interference, which decreases SINR levels. Thus, in response to $P_{AGG1}$ rising, $SINR_{VIC}$ may begin to decrease at a rate R1'. At time t2, $SINR_{VIC}$ may reach a minimum detectable level $SINR_{LO}$.

At time t3, $P_{AGG1}$ may reach $P_{HI}$ and remain fixed at $P_{HI}$ thereafter. At this time, signal generator 204-2 may be adjusted such that $P_{AGG2}$ begins to fall at a rate R2. Rate R2 may be equal to or different than R1. Reducing the output power of aggressor signals will typically result in lower levels of interference, which increases SINR levels. Thus, in response to $P_{AGG2}$ falling, $SINR_{VIC}$ may begin to increase at a rate R2' (see, e.g., time t4). At time t5, $SINR_{VIC}$ may reach $SINR_{INIT}$ and remain fixed at that level thereafter (e.g., $SINR_{INIT}$ may be dominated by noise and not by the presence of aggressor signals).

Monitoring radio-frequency metrics such as SINR as the output power levels of the aggressor signals are being adjusted can be used to characterize the performance and sensitivity of the victim radio. The example illustrated in FIG. 7 is merely illustrative. If desired, tester 230 may be used to measure any desired radio-frequency metric associated with a victim radio currently under test while using any number of signal generators to produce aggressor signals at various output power levels.

After gathering test data for the current transmit configuration, processing may loop back to step 300 to test another transmit configuration (see, e.g., path 308 in FIG. 6). When test data for all the transmit configurations has been obtained, a designer of device 10 may optimize the antenna design based on the obtained test data (step 310). For example, steps may be taken to improve isolation between adjacent antennas exhibiting high levels of interference (e.g., by increasing the physical distance between the antennas or by inserting shielding structures between the antennas). Processing may then loop back to step 300 to test the new design, as indicated by path 312. Multiple iterations may be performed in this way to optimize the antenna design of device 10 until the test measurements satisfy design criteria.

Figure 8:
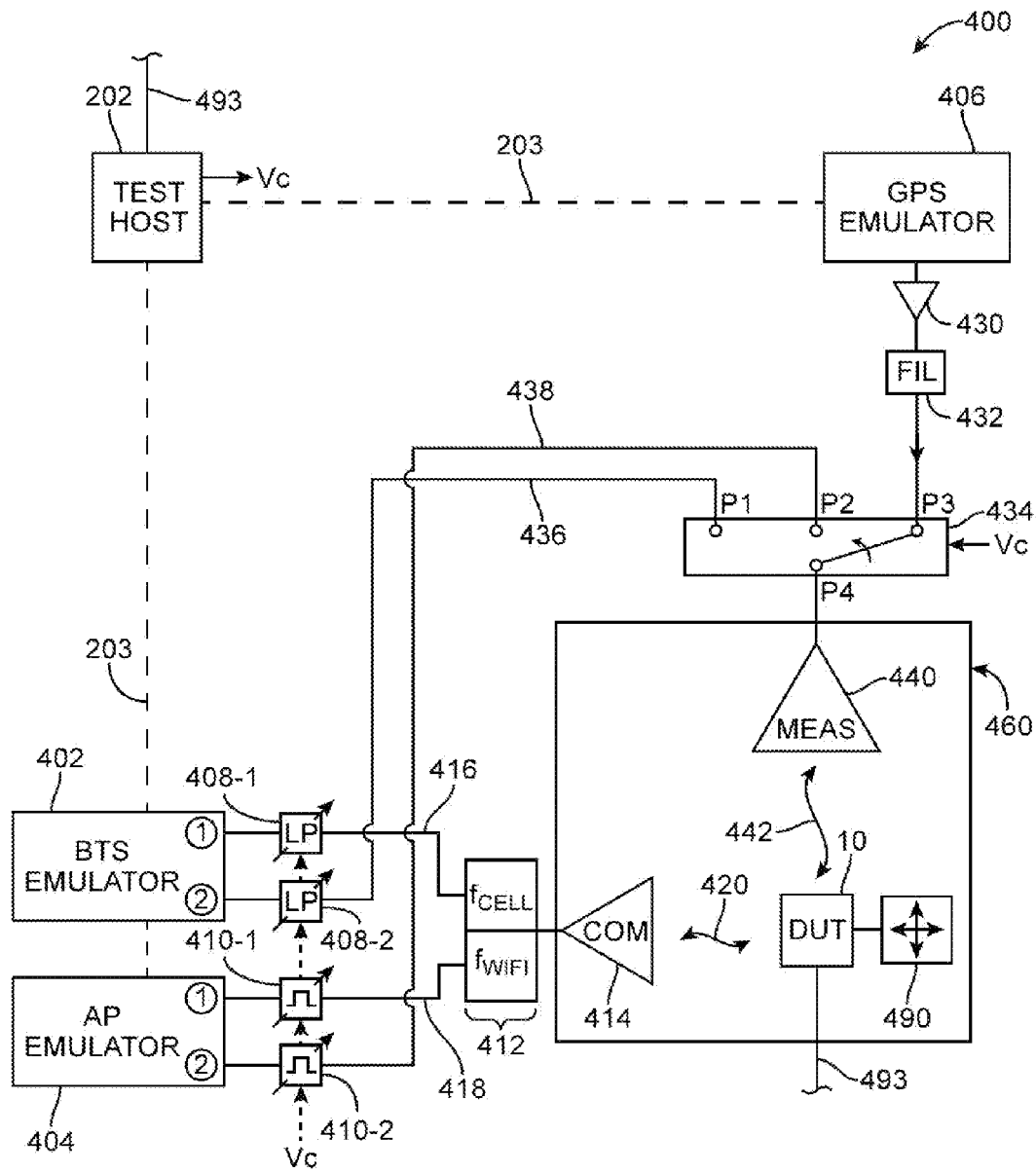
FIG. 8 is a diagram of an illustrative test system for performing active radio coexistence characterization using multiple test antennas in accordance with an embodiment of the present invention.

In another suitable arrangement, a test system such as test system 400 of FIG. 8 may be used to perform active radio coexistence characterization. During active testing, DUT 10 may be configured to transmit and receive wireless signals over protocol-compliant communications links (e.g., transceiver circuitry 90 in DUT 10 is fully activated). As shown in FIG. 8, radio-frequency test system 400 may include test host 202, test enclosure 460, a base transceiver station (BTS) emulator 402 (e.g., a call box configured to emulate signal transmission/reception of a cellular base station), a wireless local area network device emulator 404 (e.g., a device configured to emulate signal transmission/reception of an wireless access point), a satellite navigation system emulator 406 (e.g., a device configured to emulate GPS/GLONASS satellite signal transmission), test antennas such as communications antenna 414 and measurement antenna 440, cabling, and other associated test equipment. Testers such as emulators 402, 404, and 406 may receive commands from test host 202 via path 203.

DUT 10 may be placed within test enclosure 460 during active radio coexistence testing. Test enclosure 460 may be an anechoic chamber, a reverberation chamber, or other types of radio-frequency test chambers with sufficient capacity to accurately perform radiated testing. DUT 10 may optionally be coupled to test host 202 via a control line 493. The position of DUT 10 within test chamber may be controlled using positioner 490. If desired, a phantom object such as phantom object 104 (not shown) may be placed in the vicinity of DUT 10 to emulate various user scenarios.

Communications antenna 414 and measurement antenna 440 may be placed at desired locations within test enclosure 460. Communications antenna 414 may be a circular-polarized spiral antenna (e.g., an antenna that is capable of simultaneously conveying horizontal-polarized RF signals and vertical-polarized RF signals), whereas measurement antenna 440 may be a linear-polarized horn antenna (e.g., an antenna that is capable of conveying horizontal-polarized RF signals and vertical-polarized RF signals in an alternating fashion).

It may be desirable to position communications antenna 414 at a first distance from DUT 10 while positioning measurement antenna 440 at a second distance from DUT 10 that is greater than the first distance. Arranged in this way, wireless communications links established via wireless path 410 that connects DUT 10 to antenna 414 may be relatively more stable (i.e., less likely to drop calls/sessions) compared to links established via wireless path 442 that connects DUT 10 to antenna 440.

In general, it is more difficult to calibrate wireless path 420 than to calibrate path 442. As a result, test data associated with the victim radio may be gathered using measurement antenna 440 via path 442 that is carefully calibrated prior to test operations (e.g., calibration operations may be performed to accurately characterize the path loss associated with path 442).

BTS emulator 402 and AP emulator 404 may be coupled to communications antenna 414 via a frequency-based multiplexing circuit such as duplexer 412. Duplexer 412 may have a first port that is coupled to communications antenna 414, a second port that is coupled to a first (1) input-output port of BTS emulator 402 via adjustable low-pass filter circuitry 408-1, and a third port that is coupled to a first (1) input-output port of AP emulator 404 via adjustable band-pass filter circuitry 410-1. Coupled in this way, wireless signals in the cellular telephone frequency bands $f_{CELL}$ may be conveyed between emulator 402 and antenna 414, whereas wireless signals in the WiFi® communications bands $f_{WIFI}$ may be conveyed between emulator 404 and antenna 414 (e.g., telephone calls and/or active data sessions may be established between DUT 10 and emulators 402 and 404 using communications antenna 414 and the frequency selection function provided by duplexer 412).

In the example of FIG. 8, measurement antenna 440 may be coupled to a single-pole triple-throw radio-frequency switch such as configurable switching circuit 434. In particular, switch 434 may have a first switch port P1 that is coupled to a second (2) input-output port of emulator 402 via adjustable low-pass filter 408-2 that is interposed in path 436, a second switch port P2 that is coupled to a second (2) input-output port of emulator 404 via adjustable band-pass filter 410-2 that is interposed in path 438, a third switch port P3 that is coupled to satellite navigation emulator 405 via an amplifier 430 and associated filter circuit 432 (e.g., a filter suitable for passing RF signals around 1600 MHz), and a fourth switch port P4 that is coupled to measurement antenna 440. Port P4 of switch 434 may be coupled to a selected one of ports P1, P2, and P3 in switch 434.

Adjustable low-pass filter circuitries 408-1 and 408-2 may include switching circuitry and associated low-pass filters 212 arranged in the configuration described in connection with FIG. 5. Similarly, adjustable band-pass filter circuitries 410-1 and 410-2 may include switching circuitry and associated band pass filters 214 also described in connection with FIG. 5. The configuration of switch 434, low-pass filter circuitries 408-1 and 408-2, and band-pass filter circuitries 410-1 and 410-2 may be controlled using signals Vc generated by test host 202.

During active radio coexistence testing, at least one of emulators 402 and 404 may be used to communicate with DUT 10 via antenna 414 to generate aggressor radio-frequency signals. While DUT 10 is communicating with emulator 402 and/or emulator 404 via communications antenna 414, additional radio-frequency signals may be conveyed between measurement antenna 440 and DUT 10 via calibrated path 442 to help measure interference signals in the victim band of interest.

In one arrangement, test signals may be conveyed between DUT 10 and a second (2) input-output port of BTS emulator 402 via path 436 and measurement antenna 440 to characterize the amount of interference in the cellular telephone bands (e.g., by configuring switch 434 in a first state in which port P1 is connected to P4). For example, BTS emulator 402 may also be configured to monitor and analyze the signals received from DUT 10 to determine whether the level of interference in the cellular telephone bands satisfies design criteria.

In another arrangement, test signals may be conveyed between DUT 10 and a second (2) input-output port of AP emulator 404 via path 438 and measurement antenna 440 to characterize the amount of interference in the WiFi® communications band(s) (e.g., by configuring switch 434 in a second state in which port P2 is connected to P4). As an example, DUT 10 may receive test signals from AP emulator 404 and may compute desired radio-frequency metrics based on the received test signals. Radio-frequency performance metrics that may be computed and stored internally in DUT 10 may include SINR, CNO, BER, RSSI, and other suitable receive signal quality measurements.

In yet another arrangement, test signals may be transmitted from GPS emulator 406 to DUT 10 via measurement antenna 440 to characterize the amount of interference in the GPS band (e.g., by configuring switch 434 in a third state in which port P3 is connected to P4). As shown in the example of FIG. 8, DUT 10 may receive test satellite signals from emulator 406 and may compute desired radio-frequency metrics based on the received test satellite signals. Radio-frequency performance metrics that may be computed and stored internally in DUT 10 may include SINR, CNO, BER, time-to-fix, and other suitable receive performance metrics.

Figure 9:
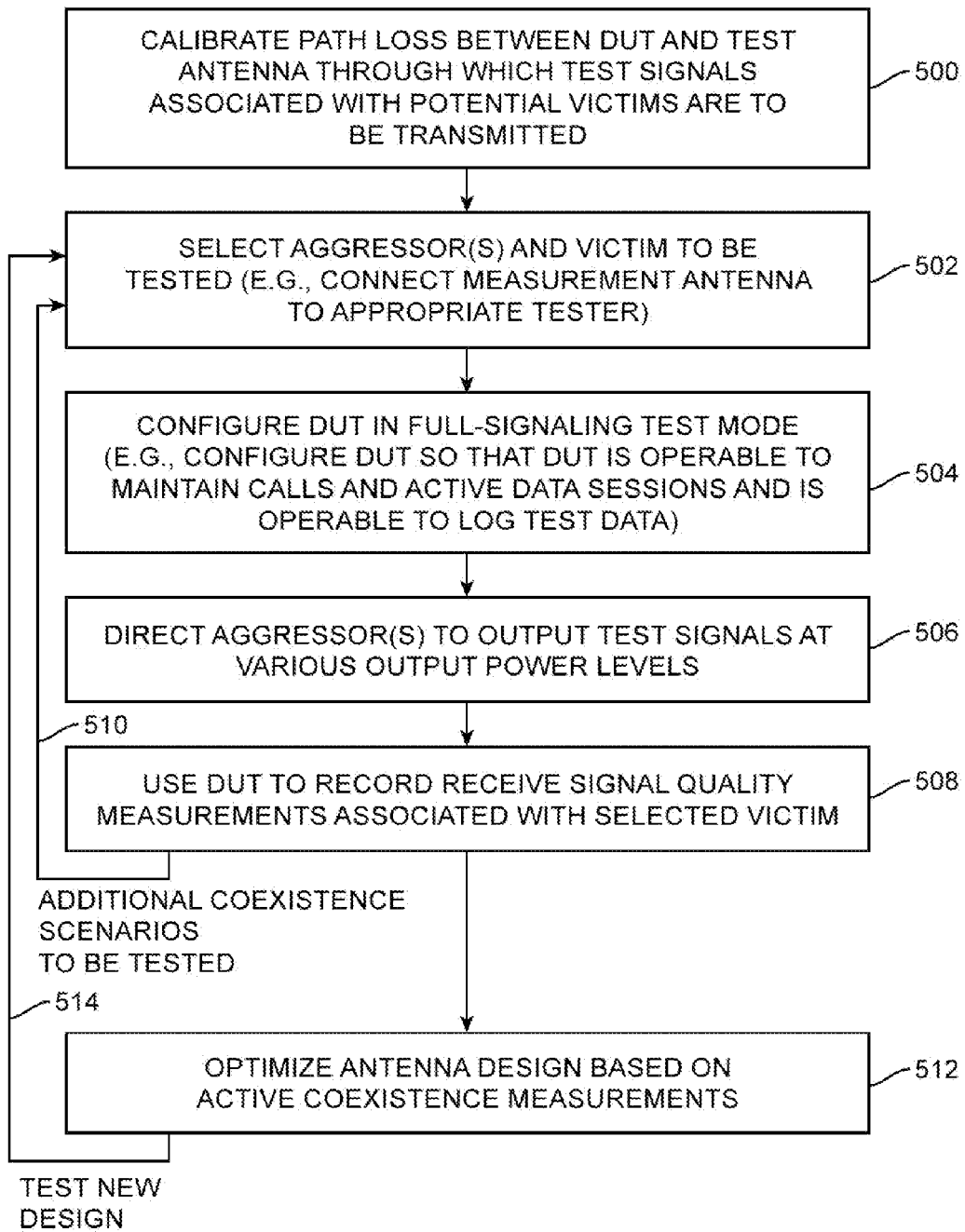
FIG. 9 is a flow chart of illustrative steps involved in performing active radio coexistence characterization in accordance with an embodiment of the present invention.

FIG. 9 is a flow chart of illustrative steps involved in performing active radio coexistence testing using test system 400 of the type described in connection with FIG. 8. At step 500, the path loss between DUT 10 and the test antenna through which test signals associated with the potential victim radio are to transmitted may be calibrated (e.g., the path loss between DUT 10 and measurement antenna 440 may be carefully calibrated using known path loss calibration techniques).

At step 502, test host 202 may select at least one aggressor radio and a victim radio to be tested. For example, at least one of BTS emulator 402 and AP emulator 404 may be activated to communicate with DUT 10 via communications antenna 414, thereby generating aggressor signals that can indirectly elevate undesired interference in corresponding victim frequency bands. Depending on the desired victim radio currently selected for testing, measurement antenna 440 may be coupled to one of testers 402, 404, and 406 by placing switch 434 in the desired state.

At step 504, DUT 10 may be configured in a full-signaling test mode (e.g., DUT 10 may be configured to maintain protocol-compliant communications links such as a cellular telephone communications link or a wireless local area network communications link and may also be used to log test data).

At step 506, test host 202 may direct the selected aggressor emulator(s) to output test signals at various output power levels (see, e.g., FIG. 7). At step 508, DUT 10 may optionally be used to record receive signal quality measurements associated with the selected victim radio. If desired, tester 402 and/or tester 404 may be used to gather radio-frequency test data from DUT 10 during active radio coexistence testing.

Processing may loop back to step 502 if there are additional coexistence scenarios left to be tested (e.g., to test the different radio interference scenarios as described in connection with FIG. 3), as indicated by path 510. When sufficient test data has been gathered, a designer may optimize the antenna design of device 10 based on the active coexistence measurements (step 512). Processing may loop back to step 502 to test whether the new design helps improve antenna performance, as indicated by path 514. Multiple iterations may be performed in this way to optimize the antenna design of device 10.

Figure 10:
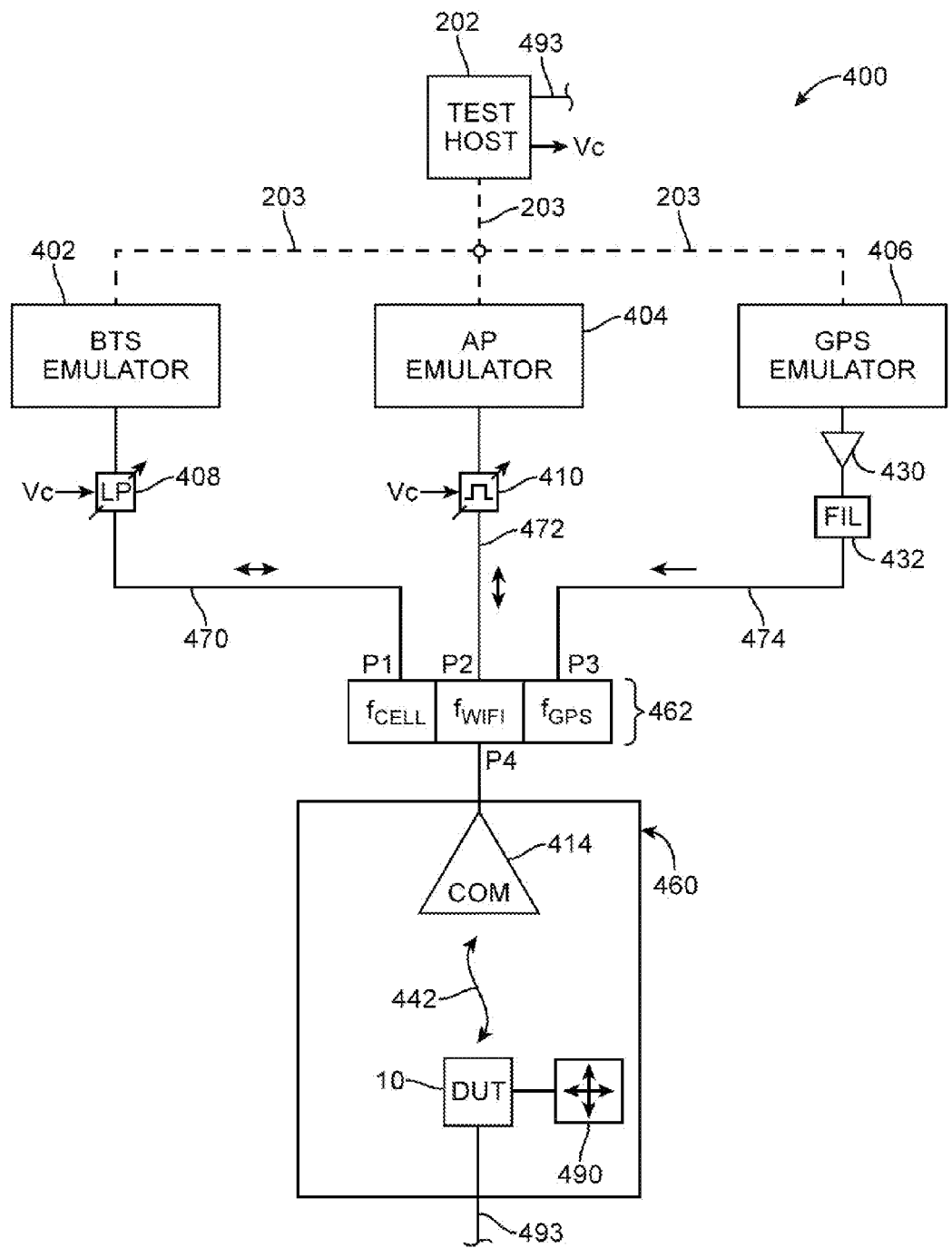
FIG. 10 is a diagram of an illustrative test system for performing active radio coexistence characterization using a single test antenna in accordance with an embodiment of the present invention.

FIG. 10 shows another suitable arrangement of test system 400 that can be used for performing active radio coexistence testing. As shown in FIG. 10, testers 402, 404, and 406 may be coupled to a single test antenna such as communications antenna 414 positioned within test enclosure 460 via a frequency-based multiplexing circuit such as triplexer 462. In particular, triplexer 462 may have a first port P1 that is coupled to BTS emulator 402 via adjustable low-pass filter circuitry 408, a second port P2 that is coupled to AP emulator 404 via adjustable band-pass filter circuitry 410, a third port P3 that is coupled to GPS emulator 406 via amplifier 430 and associated filter 432, and a fourth port P4 that is coupled to communications antenna 414.

Connected in this arrangement, radio-frequency test signals in the cellular telephone frequencies $f_{CELL}$ may be conveyed between DUT 10 and emulator 402 via triplexer 462 while test signals in the WiFi® communications frequencies $f_{WIFI}$ may be conveyed between DUT 10 and emulator 404 via triplexer 462 and while test signals at the GPS frequency $f_{GPS}$ may be transmitted from emulator 406 to DUT 10 via triplexer 462. In general, any one or both of testers 402 and 404 may contribute to the generation of aggressor signals, whereas any one of testers 402, 404, and 406 may be used in quantifying the level of interference in the victim frequency band. Test data may be gathered using the different testers or may be stored internally within DUT 10.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for using a test system to test a device under test containing a plurality of device antennas, a first wireless communications circuit that is operable in a first communications band, and a second wireless communications circuit that is operable in a second communications band, the method comprising:
   with a signal generator in the test system, providing first radio-frequency test signals in the first communications band to a given device antenna in the plurality of device antennas for wireless transmission;
   with a radio-frequency tester in the test system, receiving corresponding second radio-frequency test signals from the device under test, wherein the second radio-frequency test signals include signals in the second communications band that is different than the first communications band, and wherein the second radio-frequency test signals are generated in response to transmission of the first radio-frequency test signals from the given device antenna; and
   with configurable switching and filtering circuitry having a receive port connected to the radio-frequency tester and a plurality of antenna ports each of which is connected to a respective one of the plurality of device antennas, connecting the receive port to a selected one of the plurality of antenna ports so that the radio-frequency tester receives the second radio-frequency test signals from the DUT through the configurable switching and filtering circuitry.

2. The method defined in claim 1, wherein the device under test further includes a third wireless communications circuit that is operable in a third communications band, the method further comprising:
   with an additional signal generator in the test system, providing third radio-frequency test signals in the third communications band to another device antenna in the plurality of device antennas for wireless transmission, wherein the first and third radio-frequency signals interact to generate the second radio-frequency test signals in the second communications band.

3. The method defined in claim 1, wherein the radio-frequency tester comprises a spectrum analyzer, and wherein receiving the second radio-frequency test signals from the device under test comprises receiving the second radio-frequency test signals from the device under test with the spectrum analyzer.

4. The method defined in claim 1, further comprising:
   placing the device under test within a radio-frequency shielded enclosure during testing.

5. The method defined in claim 2, further comprising:
   coupling plurality of device antennas to the signal generator, the additional signal generator, and the radio-frequency tester with a configurable switch circuit.

6. The method defined in claim 1, further comprising:
   with an amplifier, amplifying the first radio-frequency test signals; and
   with filter circuitry, selectively filtering the amplified first radio-frequency test signals and feeding the filtered first radio-frequency test signals to the given device antenna.

7. A method of using a test system to test a multi-antenna device under containing a plurality of device antennas, a first wireless communications circuit that is operable in a first communications band, and a second wireless communications circuit that is operable in a second communications band, wherein the test system includes a plurality of radio-frequency testers and configurable switching circuitry, the method comprising:
   with at least one radio-frequency tester in the plurality of radio-frequency testers, transmitting first test signals in the first communications band to the device under test via a first test antenna;
   while the at least one radio-frequency tester is transmitting the first test signals to the device under test, transmitting second test signals in the second communications band that is different than the first communications band to the device under test via a second test antenna, wherein the first test signals interact with other components in the device under test to generate interference signals in the second communications band; and
   with the configurable switching circuitry having a plurality of tester switch ports each of which is coupled to a respective one of the plurality of radio testers and an antenna switch port coupled to the second test antenna, connecting the antenna switch port to a selected one of the plurality of testers switch ports.

8. The method defined in claim 7, wherein the at least one radio-frequency tester comprises a base transceiver station emulator, and wherein transmitting the first test signals comprises transmitting the first test signals via a cellular telephone link to the device under test via the first test antenna.

9. The method defined in claim 7, wherein the at least one radio-frequency test comprises a wireless local area network device emulator, and wherein transmitting the first test signals comprises transmitting the first test signals via a wireless local area network communications link to the device under test via the first test antenna.

10. The method defined in claim 7, wherein the device under test further includes a third wireless communications circuit that is operable in a third communications band, the method further comprising:

with at least an additional radio-frequency tester in the plurality of testers, transmitting third test signals in the third communications band to the device under test via the first test antenna, wherein the first and third test signals interact with one another to generate interference signals in the second communications band.

11. The method defined in claim 10, wherein transmitting the first and third test signals to the device under test comprises transmitting the first and third test signals to the first test antenna for wireless transmission via a frequency-based multiplexing circuit.

12. The method defined in claim 7, further comprising:
performing path loss calibration for a wireless path linking the device under test to the second test antenna.

13. The method defined in claim 7, wherein transmitting the second test signals to the device under test comprises transmitting the second test signals to the device under test with a satellite navigation system emulator.

14. The method defined in claim 7, further comprising:
placing the device under test within a radio-frequency anechoic chamber.

15. The method defined in claim 14, further comprising:
with a positioner, varying the orientation of the device under test with respect to the first and second test antennas within the anechoic chamber.

* * * * *